United States Patent [19]
Panico

[11] 3,930,176
[45] Dec. 30, 1975

[54] INNER ELECTRODE-SUPPORT SEAL FOR A GASEOUS DISCHARGE FLASHTUBE

[75] Inventor: C. Richard Panico, Medford, Mass.
[73] Assignee: Xenon Corporation, Medford, Mass.
[22] Filed: Feb. 14, 1974
[21] Appl. No.: 442,630

[52] U.S. Cl. .................. 313/220; 313/40; 313/42; 313/217; 313/240; 313/318
[51] Int. Cl.² .................. H01J 61/36; H01J 61/52
[58] Field of Search ............ 313/220, 217, 318, 40, 313/240, 42, 184; 403/179; 52/759; 29/471.9, 472.9

[56] References Cited
UNITED STATES PATENTS

| | | |
|---|---|---|
| 2,087,735 | 7/1937 | Pirani et al. .................. 313/42 |
| 2,919,369 | 12/1959 | Edgerton ..................... 313/220 X |
| 3,013,169 | 12/1961 | Gungle et al. ................ 313/240 X |
| 3,243,635 | 3/1966 | Louden et al. ............... 313/220 X |
| 3,390,296 | 6/1968 | Smith ......................... 313/182 |
| 3,450,924 | 6/1969 | Knochel et al. .............. 313/220 |
| 3,488,547 | 1/1970 | Beintema et al. ............. 313/217 X |

Primary Examiner—Palmer C. Demeo
Attorney, Agent, or Firm—Thomas N. Tarrant

[57] ABSTRACT

A gaseous discharge flashtube in which electrodes are secured and sealed inside a transparent tubular envelope by a layer of metallic solder between the inner surface of the envelope and the electrodes.

7 Claims, 5 Drawing Figures

INNER ELECTRODE-SUPPORT SEAL FOR A GASEOUS DISCHARGE FLASHTUBE

BACKGROUND OF THE INVENTION

1. Field of the Invention

The invention relates to flashtubes and in particular to flashtubes in which discharge electrodes are secured in the tubes by solder.

2. Description of the Prior Art

U.S. Pat. No. 2,756,361 to Germeshausen discloses the use of solder between the outside surface of a flashtube and an endcap to seal the tube to the end cap which in turn supports a discharge electrode inside the tube. While such solder seals had been previously used on continuous arc discharge tubes, it was surprising that the solder was able to withstand the instantaneous high temperatures of the flashtubes.

While flashtubes using the solder-seal end caps were successful and became quite popular for high intensity purposes, they have proven difficult to mass produce. For some purposes the high voltages appearing on at least one of the end caps has also been disadvantageous. For example, such tubes cannot be grouped tightly together without danger of arcing between their endcaps. Previous solder-seal flashtubes also have poor heat dissipation from the electrodes.

SUMMARY OF THE INVENTION

The present invention provides a solder-sealed flashtube without endcaps. In accordance with the invention, a discharge electrode is soldered inside the end of the tubular vitreous or quartz envelope of the flashtube. This inside soldering provides a shorter and larger area heat dissipation path from the electrode tips to the glass envelope. In a novel method of production, the inside ends of the envelope are tinned by a scraping action with a soldering tool following which the electrode assembly is inserted and heat is applied along with additional solder metal.

Thus, it is an object of the invention to provide a novel solder-sealed flashtube.

A further object of the invention is to provide a flashtube in which solder seals are used internal of the flash envelope.

A further object of the invention is to provide a high intensity flashtube adapted to facilitate mass production.

A further object of the invention is to provide solder seal flashtubes which may be clustered adjacent to each other with electrical isolation of the neighboring electrodes.

Still a further object of the invention is a novel method of forming a solder seal between an electrode and the inner surface of a vitreous or quartz envelope containing the electrode.

Further objects and features of the invention will become apparent upon reading the description together with the drawing.

DESCRIPTION OF THE PREFERRED EMBODIMENT

Figure 1:
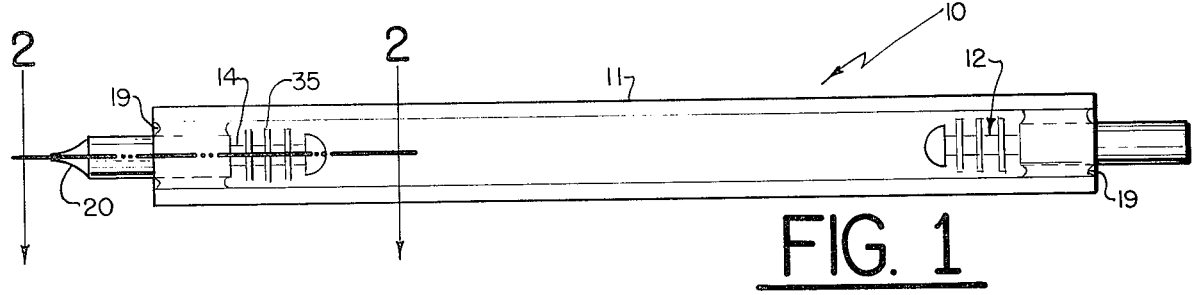
FIG. 1 is a front elevation of a flashtube according to the invention.

While flashtubes come in many shapes and sizes, gaseous discharge flashtubes frequently use a linear tubular shape as shown in FIG. 1 or a helical or U shape. In each of these cases as well as a few others, the electrodes are fitted to extend inside cylindrical portions of the envelope. Accordingly, FIG. 1 depicts flashtube 10 having a cyclindrical quartz envelope 11, first electrode 12 extending inside one end of envelope 11 and second electrode 14 extending inside the other end of envelope 11.

Figure 2:
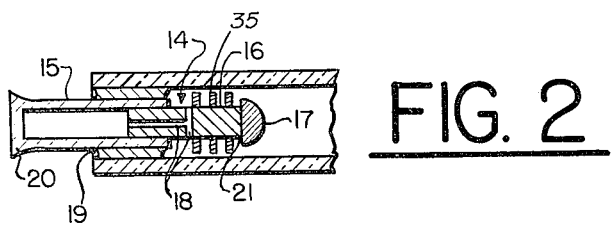
FIG. 2 is a sectional view of one end of FIG. 1.

Electrode 14 and the details of its assembly inside envelope 11 are shown more clearly in cross-section at FIG. 2. Electrode 14 is depicted in FIG. 2 as an assembly of three parts. Typically these are copper tube 15, cylindrical pin 16, and tungsten tip 17. Pin 16 is suitably copper, aluminum or some one of many alloys. The particular metals of which these assemblies are made are not critical to the invention. Electrode 14 could be made in one homogeneous piece, but this is usually impractical. In order to sustain the stresses of electrical discharge without rapid deterioration and without contaminating the interior of the tube, tip 17 is preferably a tungsten alloy or similar precious metal. Not only is tip 17 normally an expensive material, but tungsten, for example, is difficult to bond and nearly impossible to join by solder. Pin 16 is preferably solid or nearly so in order to provide maximum heat dissipation from tip 17. Copper is a convenient choice for tube 15 since it accepts solder readily, facilitates gas fill and pinchoff, and is an excellent thermal and electrical conductor. Looking at FIG. 2, it will be seen that pin 16 contains drilled passageways 18 connecting the interior space of flashtube envelope 11 with tube 15. Both FIGS. 1 and 2 depict a crimped end portion 20 of tube 15 which seals the end of tube 15 after flashtube 10 has been charged with gas. Pin 16 has been joined to tube 15 by soldering, brazing and crimping. Joint 21 between tip 17 and pin 16 is made by welding, or brazing. In some cases, pin 16 has been hollow and a crimp joint has been made to tip 17.

Figure 3:
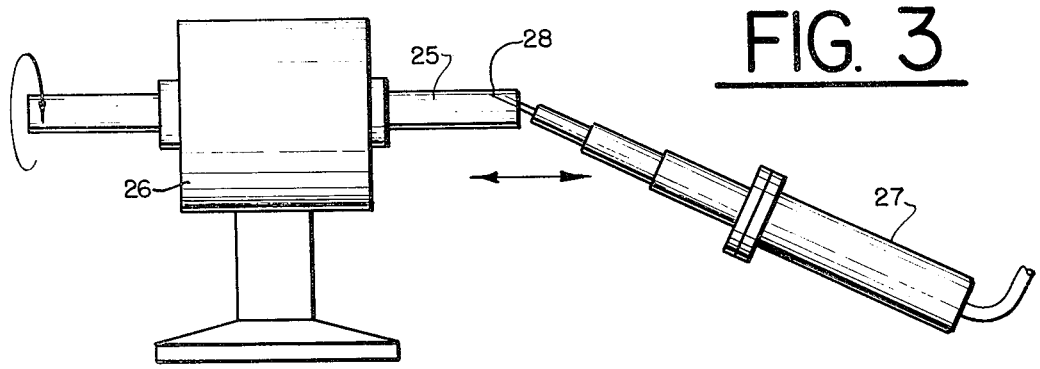
FIG. 3 is a diagrammatic illustration of "tinning" the inside of the flashtube envelope.

In production, electrode assembly 14 is commonly made up separately. In order to solder electrode assembly 14 to the interior surface of envelope 11 it has been found desirable to "wet" the inside surface of envelope 11 with solder first. While any of the known processes for "tinning" glass or quartz may be used, it has been found possible to "tin" the envelope with a heated soldering tool. Both heat-resistant glass and quartz have been successfully tinned in this manner without the use of any kind of chemical "flux". This operation is depicted in FIG. 3. Quartz tube 25 is secured in a rotating device 26 and rotated. Soldering tool 27 having sharp tip 28 well "wetted" with soft solder has its tip placed inside the end of tube 25 with a sharp edge bearing against the inside wall of the tube. Tip 28 is caused to move back and forth in a scraping action while tube 25 is rotated. This procedure is continued with the addition of further solder if necessary until the desired seal area is completely wetted with the solder. Indium and indium alloy solders have been found particularly suitable for this purpose. An electrical soldering tool of the "pencil" type operated at a temperature in the range of 500° to 1000° F. has been used with excellent results. A small chisel tip provides a sharp edge that bears readily against the tube wall.

Figure 4:
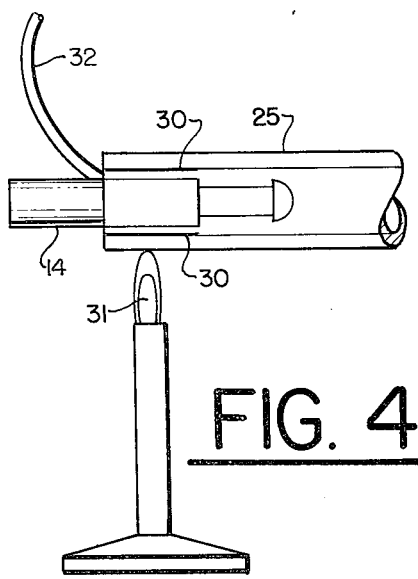
FIG. 4 is a diagrammatic illustration of solder sealing one end of a flashtube according to the invention; and, FIG. 5 is a sectional view of a variation of one end of FIG. 1.

Once the interior surfaces of tube 25 have been tinned at the seal areas as depicted by heavy lines 30 in FIG. 4, electrode assembly 14 can be secured and sealed in place. For this purpose, the surface of tube 15 is tinned leaving an excess of residual solder, assembly 14 is inserted in the end of tube 25 and heat is applied as by a gas flame 31. Additional solder is added during heating until a good solder joint is obtained. In actual production an electrical heating element or induction heater has been found preferable to the use of flame 31 depicted for ease of illustration. For the same reason a jig fixture supporting electrode structure 14 relative to tube 25 during soldering has been omitted in the figure. Rotation of electrode assembly 14 relative to tube 25 during soldering and even after removal of applied heat has been found helpful.

After both electrode assemblies have been soldered in place, tube 25 is evacuated, filled with a suitable gas and then sealed at the fill connection in the usual manner.

Figure 5:
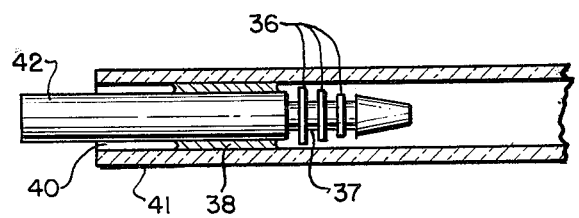

When flashtubes are operated at or near peak ratings and particularly with short high intensity pulses, a strong thermal shock wave is produced. With a solder seal exposed directly to this shock wave, it is sometimes desirable to provide some buffering. Disks or cones mounted on the electrodes can serve this purpose. Disks 35 in FIG. 1 and 36 in FIG. 5 are provided to buffer the thermal shock waves. Disks 35 and 36 are press fit or brazed to electrodes 14 and 37 respectively. A suitable material is an iron-nickel alloy having a low coefficient of expansion such as "Nilvar" available from the Driver-Harris Company of Harrison, New Jersey. Some flexibility is considered desirable to reduce shock loading on the disks themselves as well as the electrodes. The disks are preferably in a plural array either of the same diameter as disks 35 or graduated diameter as disks 36.

FIG. 5 depicts an embodiment in partial cross-section to show interior solder seal 38 that is spaced from end 40 of envelope 41. By recessing solder seal 38 about one half inch from end 40 and covering projecting end 42 of electrode 37 with a high dielectric strength insulator that has an outside diameter not exceeding the diameter of envelope 41, an array of flashtubes can be clustered adjacent to each other. This arrangement allows electrical isolation of adjacent flashtubes with the flashtube envelope wall insulating arcing from the seal.

The amount of voltage that can be withstood in this manner depends on the thickness of the envelope and the manner and material with which the projecting electrode is insulated. Desirably the insulation extends over electrode end 42 up inside envelope 41 to seal 38.

While the invention has been described with relation to details of specific embodiments, this is not intended to be limiting. Hollow electrodes, different tube shapes, different known methods of applying solder and bonding the electrode assembly together are all contemplated and it is the intention to protect the invention as set forth within the scope of the appended claims.

I claim:

1. A gaseous discharge flashtube in which the discharge electrode assemblies are soldered to the envelope of the flashtube comprising:
   a. A transparent heat-resistant envelope having cylindrical terminal portions;
   b. a discharge electrode assembly mounted in each said cylindrical terminal portion (with all metallic portions of each said assembly within the perimeter of the extended internal circumference), said discharge electrode assembly assembled from metal components having a total maximum outside diameter smaller than the internal diameter of the respective cylindrical terminal portions; and,
   c. a layer of metallic solder surrounding a supporting portion of each electrode assembly between the electrode assembly and the inner surface of said envelope fused to both said electrode assembly and said envelope so as to sealingly support said electrode assembly in said envelope.

2. A gaseous discharge flashtube according to claim 1 wherein said electrode assemblies are entirely supported from the inside of said envelope.

3. A gaseous discharge flashtube according to claim 1 wherein gaseous entry to said envelope is through the interior of at least one of said electrode assemblies.

4. A gaseous discharge flashtube according to claim 1 wherein said layer of solder commences substantially one half inch from the respective end of said envelope.

5. A gaseous discharge flashtube according to claim 1 wherein a plurality of thermal shock wave baffles are secured to each said discharge electrode assembly within said envelope.

6. A gaseous discharge flashtube according to claim 5 wherein said baffles are flexible disks of low-coefficient-of-expansion metal, the disks on each electrode having graduated diameters.

7. A gaseous discharge flashtube according to claim 1 wherein said layer of metallic solder is soft solder and the layer of solder is recessed from the ends of the envelope.

* * * * *